C. E. ROGERS.
MEANS FOR AND METHOD OF DESICCATING FLUIDS.
APPLICATION FILED SEPT. 17, 1914.

1,243,878.

Patented Oct. 23, 1917

WITNESSES:
Emens B. Wisner
John Urban

INVENTOR.
CHARLES E. ROGERS
BY
Charles E. Wisner
ATTORNEY.

UNITED STATES PATENT OFFICE.

CHARLES E. ROGERS, OF DETROIT, MICHIGAN.

MEANS FOR AND METHOD OF DESICCATING FLUIDS.

1,243,878.  Specification of Letters Patent.  Patented Oct. 23, 1917.

Application filed September 17, 1914. Serial No. 862,159.

*To all whom it may concern:*

Be it known that I, CHARLES E. ROGERS, a citizen of the United States, residing at Detroit, county of Wayne, State of Michigan, have invented a certain new and useful Improvement in Means for and Methods of Desiccating Fluids, and declare the following to be a full, clear, and exact description of the same, such as will enable others skilled in the art to which it pertains to make and use the same, reference being had to the accompanying drawings which form a part of this specification.

This invention relates to a method of desiccating liquids, either in a natural or condensed state, and containing either animal or vegetable matter, and an object of the invention is a method whereby the constituent solids of such matter may be rapidly and practically completely recovered in the form of a substantially dry powder. A further object is a method whereby a greater volume of fluid may be desiccated than is possible with known apparatus utilizing an equal volume of heated air. Another object is a process in which the moisture laden air is continuously removed from the desiccating chamber to provide space for inflowing heated dry air, and the chamber thus continuously maintained in a dry state.

These and other features of the process are hereinafter more fully described and claimed and an apparatus for the performance of the process is shown somewhat diagrammatically in the accompanying drawings in which—

Similar characters refer to similar parts throughout the drawing and specification.

Figure 2:
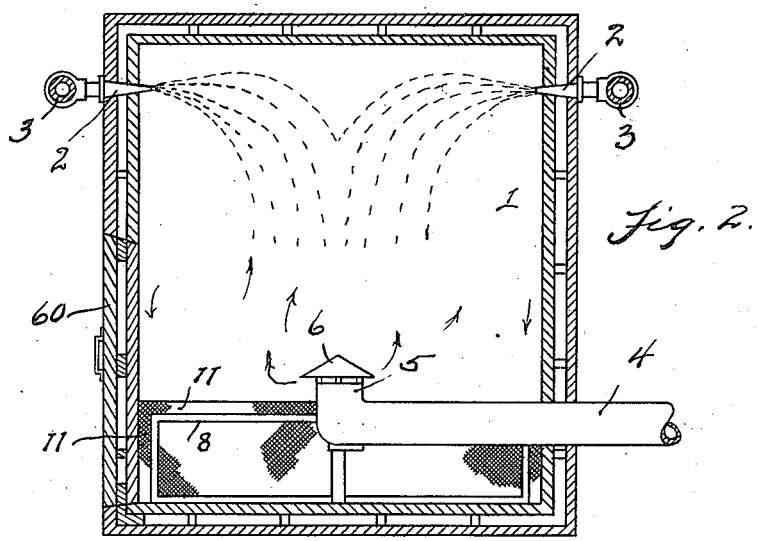
Fig. 2 is a similar section taken at a right angle to that of Fig. 1.

The apparatus consists of a chamber 1 formed with double walls spaced apart to insulate the interior thereof from the lower temperature of the outside atmosphere. Entering the chamber at the top and on opposite sides thereof as shown in Fig. 2, or upon all sides if so desired, are the spray nozzles 2, 2, etc., there being a number of such nozzles along each side. Each of the nozzles is connected with spray pipes 3, 3, which are preferably insulated from the outside air, although not so shown. Entering the chamber near the bottom is an air conduit 4 terminating in an upturned end 5 having a deflector plate 6 thereon. Air is supplied to the conduit by means of a blower not shown, the air being heated previous to entering the chamber by means of steam pipes or other convenient well known means.

Figure 1:
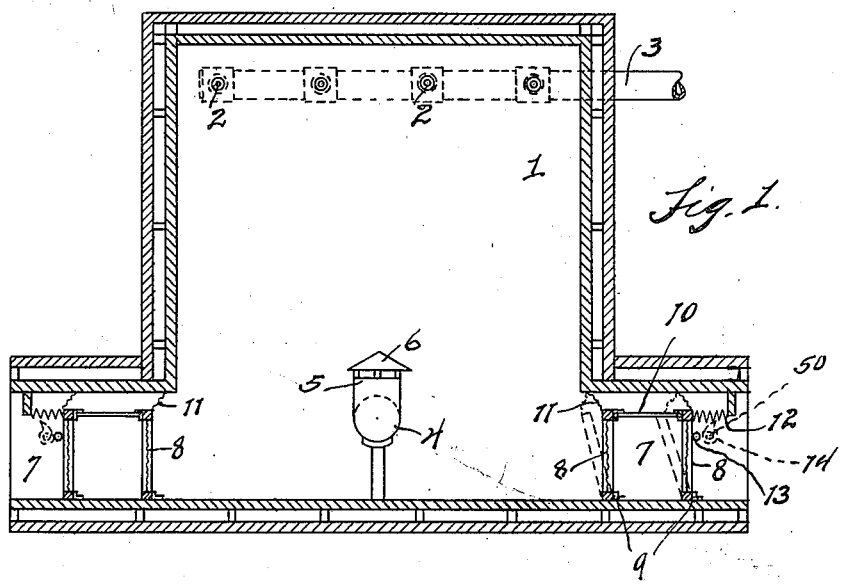
Figure 1 is a vertical section thereof.

The chamber at the bottom below the discharge end of the air conduit is provided on opposite sides with outlet conduits 7, 7, and each conduit is provided with a pair of screens 8, 8, pivoted at the bottom 9 and united at the top by the bar 10 pivoted to each frame. The frames are covered with cloth or other suitable screen material and between the sides and ends of the frames and the conduit wall is also inserted a loose piece 11 of similar material allowing the frames to be vibrated. The frames are held in vertical position by means of a spring 12 or a number of such springs, and across the back of the outer frame is a rod 13 contacted by a cam 14. There is a cam 14 at each end of the frame secured to a cam shaft 50, and by revolution of the cam shaft by any convenient method, the screens are forced to the position shown by dotted lines in Fig. 1, by reason of the high points of the cams contacting the rod 13 and as the high points of the cams ride off from the rod the springs 12 quickly move the frames back to vertical position with sufficient force to jar the powder from the screens.

The operation of the apparatus is as follows:—The air is forced through the conduit 4 and enters the chamber at a temperature of 180 to 200 degrees F. The fluid to be desiccated is forced under pressure through the pipes 3 and is sprayed into the interior of the chamber at the top through the nozzles 2. In the case of desiccation of a fluid such as condensed milk it should be maintained at a temperature of substantially 140 degrees F. and as the fluid enters the chamber in a finely divided state, the particles fall through an ascending current of heated air. The air being warmer at the bottom of the chamber immediately after passing from the end 5 of the air conduit, the particles are, therefore, completely dried by the time they reach the floor of the compartment. Also as the air becomes moisture laden it naturally falls to the bottom of the chamber and passes out through the screens 8 at the bottom, and thus the atmosphere of the compartment is maintained in a comparatively dry state. The air entering the chamber is dry, and as it passes upward from the mouth 5 of the conduit coming in contact with the spray it becomes cooled and moisture laden, and its natural path of travel is then downward and out through the screens where all floating particles of dried fluid are separated from the air.

The dried particles fall to the floor of the compartment in the form of a powder and may be removed therefrom in any convenient way through a doorway 60. The capacity of the apparatus is substantially double that of other types using the same volume of heated air, as the spray is made to pass vertically through a continuously ascending volume of hot air which holds the particles in suspension for a greater period than is usual, whereas with most other apparatus commonly in use the spray is made to pass into the chamber with the air, or through air that is of substantially the same temperature throughout. The method disclosed thus increases the efficiency of the apparatus.

The delivery end 5 of the conduit should be slightly above the plane of the upper side of the conduit 7, so that the air passing into the chamber first ascends before passing out of the conduits at the bottom.

From the foregoing description it becomes evident that the essential step or steps of the process consist in spraying the liquid into and allowing it to fall through an ascending current of heated air in a chamber and removing the moisture laden air from the bottom of the chamber through screens.

Having thus briefly described my process and apparatus by means of which it may be performed, what I claim and desire to secure by Letters Patent of the United States is—

1. In a method of desiccating fluids, the step consisting in spraying the fluid into and allowing it to fall through an ascending current of heated air in a chamber, and discharging the moisture laden air through a screened aperture in the chamber wall near the bottom.

2. The herein described method of desiccating fluids consisting in spraying the fluid into the top of a chamber and allowing it to fall through an ascending current of heated air introduced centrally of the bottom of the chamber, and discharging the moisture laden air through screened openings in the chamber wall near the bottom.

3. In a method of desiccating fluids, the steps consisting in spraying the fluid into and allowing it to fall by gravity through a current of heated air upwardly impelled centrally of the compartment, and removing the moisture laden air near the bottom of the compartment through screened openings in the wall thereof.

4. The herein described method of desiccating fluids consisting in discharging the fluid in finely divided form into a chamber to fall through an ascending current of heated air and discharging the air through screens below the point of its introduction into the chamber.

5. The herein described method of desiccating fluids containing animal or vegetable matter, consisting in spraying fluid into the top of a chamber at several points and toward the center allowing it to fall through a current of heated air ascending centrally of the chamber and discharging the moisture laden air from the chamber through screened openings in the periphery thereof.

6. The herein described method of desiccating fluids consisting in spraying the fluid in finely divided form into the upper part of a confined, moving, body of air continuously renewed at a point below the introduction of the fluid, and removing the moisture laden air at a point below the point of renewal.

7. In desiccating apparatus, a desiccating chamber, means for introducing fluid in the form of a spray into the chamber near the top, and means for introducing heated air centrally into the chamber near the bottom, said chamber having an outlet in the wall for the moisture laden air.

8. In desiccating apparatus, a desiccating chamber, means for spraying the fluid into the chamber near the top, means for introducing heated air centrally into the chamber near the bottom, an outlet conduit for the air in the wall of the chamber near the bottom, and screens through which the air must pass to pass through the outlet.

9. In desiccating apparatus, a desiccating chamber, means for introducing heated air thereinto centrally near the bottom, means for spraying the fluid into the ascending current of air near the top, outlet conduits for air below the point of its introduction in the chamber and screens through which the air must pass to pass through the outlet.

10. In desiccating apparatus, a desiccating chamber, an inlet conduit for air near the bottom of the chamber arranged to discharge air in an upward direction centrally of the chamber, means for forcing heated air through the inlet conduit, spraying devices near the top of said chamber arranged to direct sprayed fluid into the upwardly flowing current of heated air, means for forcing fluid through the spray devices, and screened outlet conduits for air near the bottom of the chamber.

11. The herein described method of desiccating milk consisting in first condensing the same to remove a large part of the moisture and then spraying the fluid while heated to a temperature of substantially 140 degrees F. into a chamber and allowing it to fall through an ascending current of air therein having a temperature of substantially 180 to 200 degrees F. for a distance sufficient to permit absorbtion of the desired amount of the remaining moisture, and passing the air from the chamber through screens.

In testimony whereof I sign this specification in the presence of two witnesses.

CHARLES E. ROGERS.

Witnesses:
RICHARD ALSPAS,
CHARLES E. WISNER.